Aug. 15, 1933.  F. H. BATT  1,923,047
PERMANENT MAGNET
Filed Oct. 21, 1931

Patented Aug. 15, 1933

1,923,047

UNITED STATES PATENT OFFICE 1,923,047

PERMANENT MAGNET

Frederick Horace Batt, Hollinwood, England, assignor to Ferranti Inc., New York, N. Y.

Application October 21, 1931, Serial No. 570,223, and in Great Britain October 27, 1930

6 Claims. (Cl. 175—338)

It is often necessary to use one or more permanent magnets for braking or other purposes, e. g. in electricity meters operating on A. C. and on D. C., and it is usually required that some adjustment of the effectiveness of this magnet or magnets be provided.

This invention relates to permanent magnets and more specifically to means for varying the braking effect thereof upon a rotor adapted to rotate in the magnetic field thereof.

Where one magnet is employed it is usual either to provide for alteration of the radius of operation of the flux or to shunt a part of the permanent magnet gap flux by means of a shunting piece which has portions necessarily on each side of and partially embraces the disc.

Where two magnets are employed the radius of operation of the fluxes may be altered or parts of the permanent magnets' gaps fluxes may be shunted by shunting pieces which have portions necessarily on each side of, and partially embrace, the disc, or again the paths of a portion of the fluxes may be changed and caused to pass through the two magnets in series instead of through the main gaps: in this case it is usual to arrange the magnets with opposite poles corresponding.

The object of the present invention is to provide improved or simplified means of obtaining an adjustment of the braking effect of permanent magnets.

It is a fact that within wide limits, which are more than sufficient for most cases in practice, an alteration of the flux concentration gives a corresponding alteration in effective braking.

The present invention consists in the provision of means for varying readily the flux distribution in the air gap so as to vary the effective braking of a permanent magnet.

The invention also consists in a permanent magnet provided with an auxiliary pole piece member capable of movement serving to vary the flux distribution in the air gap.

The invention also consists in means for varying the effective braking of a permanent magnet comprising a plate of magnetizable material encircling at least one of the pole pieces and capable of axial movement thereon, preferably by means of a screw.

The invention also consists in means for varying the effective braking of permanent magnets substantially as hereinafter described with reference to the accompanying drawing.

The accompanying diagrammatic drawing illustrates one convenient construction in accordance with the present invention, in which:—

Figure 1:
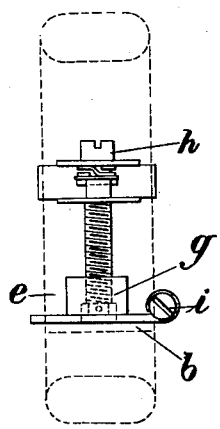
Figure 2:
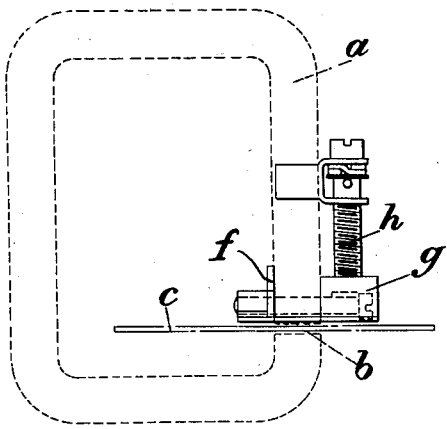

Figure 1 represents a front view,

Figure 2 a corresponding side view, and

Figure 3:
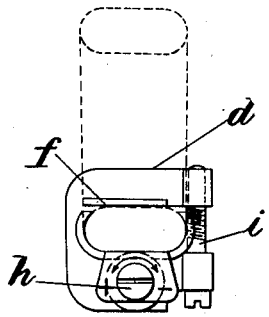

Figure 3 a plan view, the permanent magnet in each case being shown in dotted lines.

In carrying the invention into effect according to one convenient example, as applied to a single C-shaped magnet $a$ with a narrow gap $b$, this magnet operating as a brake on an alternating current meter disc $c$, rotating in the gap, I provide one or both poles of the magnet with a rectangular plate or auxiliary pole piece $d$ embracing the pole but free to move axially thereon. When this plate occupies a position at the extreme end of the pole piece $e$, minimum flux concentration is thus obtained, while as the plate is moved away from the gap the concentration of flux will be increased and the braking effect upon the disc rendered more effective.

Conveniently the encircling plate $d$ has a part of its plane surface (which part would otherwise have to be removed to allow the plate to embrace the pole piece) turned up at right angles to itself, the right-angled portion $f$ coming into sliding contact with the side of the pole.

I provide for axially adjusting the encircling plate to the desired position conveniently by means of a tapped collet $g$ secured to the plate and a screw $h$ so supported as to be incapable of axial movement. The plate is split at one point and provided with means such as a screw $i$ for contracting the encircling hole upon the pole piece. The encircling plate, however, may be clamped to the magnet pole piece by other means, e. g. by a cam.

Having now described my invention what I claim as new and desire to secure by Letters Patent is:—

1. A permanent magnet, at least one pole piece of which is furnished with an auxiliary pole piece member having a considerable surface area in in comparison with that of the adjacent pole piece face, so mounted as to be movable in a direction parallel to the longitudinal axis of the pole piece.

2. A permanent magnet as claimed in claim 1, including means for moving axially said auxiliary pole piece member comprising a screw so mounted on the magnet as to be rotationally free but axially restrained in both directions.

3. Means for varying the braking effect of a permanent magnet comprising a plate of magnetizable material embracing a pole piece thereof, said plate having a face parallel to the working face of the permanent magnet pole piece of considerably greater area in comparison with that of the pole piece face and means for moving said plate in a direction co-axial with the magnet pole piece.

4. Means for varying the braking effect of a permanent magnet comprising a U-shaped plate of magnetizable material, part of which is turned up at right angles to itself so as to act as a guide member whilst the plate embraces a pole piece of the magnet, said plate having a considerable surface area in comparison with that of the adjacent pole piece face.

5. Means for varying the braking effect of a permanent magnet comprising a U-shaped plate of magnetizable material, part of which is turned up at right angles to itself so as to act as a guide member whilst the plate embraces a pole piece of the magnet, said plate having a considerable surface area in comparison with that of the adjacent pole piece face, and means for moving said plate in a direction parallel to the axis of the pole piece.

6. Means for varying the braking effect of a permanent magnet comprising a U-shaped plate of magnetizable material, part of which is turned up at right angles to itself so as to act as a guide member whilst the plate embraces a pole piece of the magnet, said plate having a considerable surface area in comparison with that of the adjacent pole piece face, means for moving said plate in a direction parallel to the axis of the pole piece, and locking means serving to retain said plate in definite axial position upon the pole piece.

FREDERICK HORACE BATT.